(12) United States Patent
Karl et al.

(10) Patent No.: US 9,227,477 B2
(45) Date of Patent: Jan. 5, 2016

(54) VIBRATION DAMPER FOR A MOTOR VEHICLE

(71) Applicants: Frank Karl, Werneck (DE); Thomas Pflaum, Bamberg (DE)

(72) Inventors: Frank Karl, Werneck (DE); Thomas Pflaum, Bamberg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/470,282

(22) Filed: Aug. 27, 2014

(65) Prior Publication Data

US 2015/0061203 A1 Mar. 5, 2015

(30) Foreign Application Priority Data

Aug. 27, 2013 (DE) .......................... 10 2013 217 028

(51) Int. Cl.
*F16F 9/38* (2006.01)
*F16F 13/00* (2006.01)
*B60G 15/06* (2006.01)

(52) U.S. Cl.
CPC .............. *B60G 15/06* (2013.01); *B60G 15/062* (2013.01); *B60G 15/063* (2013.01); *F16F 9/38* (2013.01); *F16F 13/007* (2013.01); *B60G 2202/312* (2013.01); *B60G 2204/1242* (2013.01)

(58) Field of Classification Search
CPC ......... F16F 9/38; F16F 13/005; F16F 13/007; F16F 2230/0023; F16F 2230/10; F16F 2230/105; B60G 15/06; B60G 15/062; B60G 15/063; B60G 2204/1242; B60G 2202/31; B60G 2202/312

See application file for complete search history.

(56) References Cited

U.S. PATENT DOCUMENTS

| | | | |
|---|---|---|---|
| 6,883,651 B2 * | 4/2005 | Fukaya | B60G 11/14 188/322.12 |
| 7,806,392 B2 | 10/2010 | Ishikawa | |
| 2003/0209395 A1 | 11/2003 | Fukaya | |
| 2012/0319338 A1 * | 12/2012 | Takada | F16F 9/38 267/217 |
| 2014/0138931 A1 * | 5/2014 | Endo | B60G 15/062 280/124.157 |

FOREIGN PATENT DOCUMENTS

| | | |
|---|---|---|
| DE | 19748634 | 5/1998 |
| DE | 102010063101 | 6/2012 |
| JP | 2002-031 181 | 1/2002 |

\* cited by examiner

*Primary Examiner* — Anna Momper
(74) *Attorney, Agent, or Firm* — Cozen O'Connor

(57) ABSTRACT

A vibration damper for a motor vehicle with a support spring, includes a damper tube with a longitudinal extension axis A, a spring disk, a protective insert, and a protective accordion boot which has a first end portion and a second end portion, wherein the protective accordion boot is secured at least indirectly to a piston rod by its first end portion, and wherein the protective accordion boot encloses damper tube in circumferential direction by its second end portion. The protective insert has at least one radially outwardly extending supporting portion, wherein the protective accordion boot is axially supported by the second end portion thereof at the supporting portion of the protective insert accompanied by a defined axial pre-loading, and wherein, with respect to the longitudinal extension axis A of the damper tube, the supporting portion extends radially beyond the inner diameter d of an end coil of support spring supported at the spring disk.

9 Claims, 4 Drawing Sheets

VIBRATION DAMPER FOR A MOTOR VEHICLE

BACKGROUND OF THE INVENTION

1. Field of the Invention

The present invention is directed to a vibration damper for a motor vehicle including an accordion boot and a protective insert.

2. Description of the Related Art

DE 10 2010 063 101 A1 discloses a generic vibration damper which has a damper tube with a longitudinal extension axis (A), a spring disk, a protective insert and a protective accordion boot. The spring disk has a tubular spring disk collar surrounding a damper tube in circumferential direction. The spring disk further has a contact portion spaced apart axially from the spring disk collar, a support spring being axially supported at the substantially plate-shaped radial extension of the contact portion. With its disk-shaped portion, the protective insert covers the surface of the contact portion of the spring disk facing the support spring. The spring disk collar is covered by the tubular portion of the protective insert. The protective accordion boot surrounds the damper tube in circumferential direction, one end of the protective accordion boot being axially supported at the protective insert.

When the vibration damper is under heavy stress, for example, when driving over potholes, it cannot be ruled out in view of the relatively small difference in diameter between the outer diameter of the protective insert and the inner diameter of the protective accordion boot in the shared contact area that the protective accordion boot will slip over the protective insert and come in contact with the support spring. If this were to happen, the protective accordion boot would rub against the spring during compression and/or rebound of the vibration damper and would damage the corrosion-resistant coating, which would inevitably lead to premature corrosion and breakage of the support spring.

In view of the set of problems mentioned above, it is an object of the present invention to further develop a vibration damper so as to prevent rubbing contact between the protective accordion boot and the support spring.

SUMMARY OF THE INVENTION

This object is met according to the invention in that the protective insert has at least one radially outwardly extending supporting portion, wherein the protective accordion boot is axially supported by the second end portion thereof at the supporting portion of the protective insert accompanied by a defined axial pre-loading, and wherein, with respect to the longitudinal extension axis of the damper tube, the supporting portion extends radially beyond the inner diameter of an end coil of support spring supported at the spring disk.

According to an advantageous embodiment, at least the supporting portion of the protective insert is formed of a material having elastic properties. In this way, the supporting portion can be reversibly deformable when mounting the support spring so that the end coil of the support spring can pass the supporting portion. After recovering its original shape, the supporting portion can continue to axially support the protective accordion boot.

According to a further advantageous embodiment, the supporting portion can be formed directly at the tubular portion of the protective insert. Further, it is possible to form the supporting portion and protective insert integrally, i.e., as one component part, which would reduce the number of component parts and have advantageous results for the production process.

The supporting portion can also be constructed so as to comprise a plurality of segments as indicated in a further advantageous embodiment.

In a further advantageous embodiment, the tubular portion of the protective insert has at least one radially and axially extending recess. Further, the spring disk and/or protective insert can have an anti-torsion arrangement for the support spring such that the support spring is fixed with respect to rotational torsion relative to the spring disk.

In a further advantageous embodiment, the protective insert has a sealing lip which sealingly contacts the damper tube on the outer side in circumferential direction.

BRIEF DESCRIPTION OF THE DRAWINGS

Further details and advantages of the present invention are given in the following description of an exemplary embodiment in combination with the drawings in which.

DETAILED DESCRIPTION OF THE PRESENTLY PREFERRED EMBODIMENTS

Figure 1:
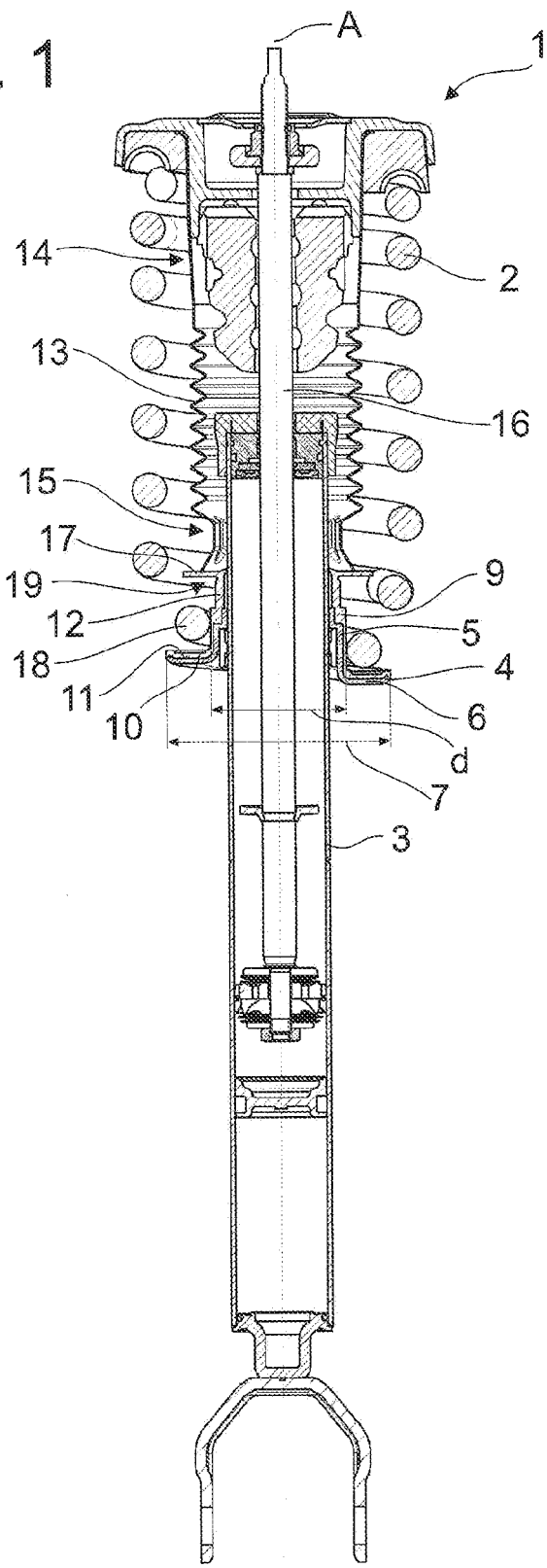
FIG. 1 is a sectional view of an exemplary embodiment of the vibration damper according to the present invention.

FIG. 1 shows a sectional view of an embodiment of a vibration damper 1 for a motor vehicle having a support spring 2. This vibration damper 1 has a damper tube 3 with a longitudinal extension axis A, a spring disk 4, a protective insert 9 and a protective accordion boot 13.

The spring disk 4 has a substantially tubular spring disk collar 5 which circumferentially embraces the damper tube 3. The spring disk 4 further has a contact portion 6 which is spaced apart axially from the spring disk collar 5. The contact portion 6 axially supports the support spring 2 by its substantially plate-shaped radial extension 7.

The protective insert 9 is arranged between spring disk 4 and support spring 2 and has a substantially disk-shaped portion 10 which in the embodiment shown herein almost completely covers the surface 11 of contact portion 6 of spring disk 4 facing support spring 2. Further, protective insert 9 has a further tubular portion 12 which covers spring disk collar 5.

The protective accordion boot 13 has a first end portion 14 and a second end portion 15 and is secured indirectly to a piston rod 16 by its first end portion 14. The protective accordion boot 13 surrounds damper tube 3 in circumferential direction by its second end portion 15 but with a defined air gap between the inner wall of protective accordion boot 13 and the outer surface of damper tube 3.

Figure 2:
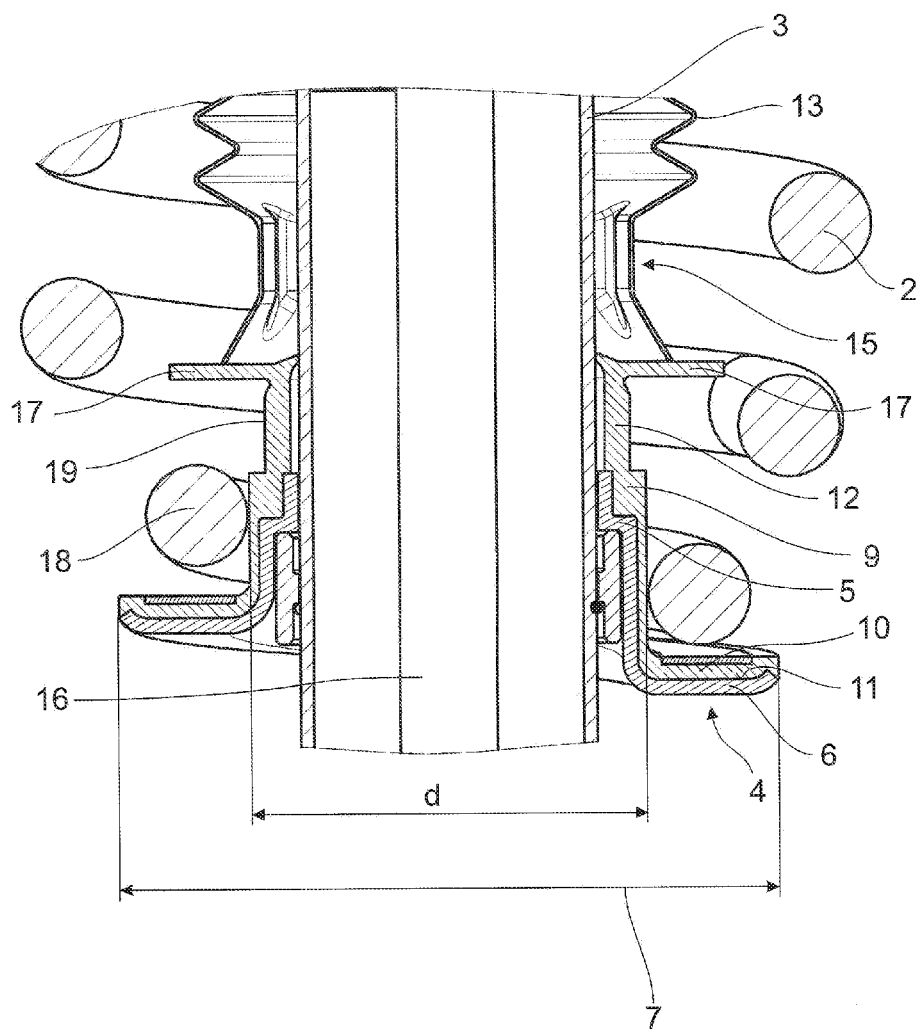
FIG. 2 is an enlarged sectional view of the vibration damper according to FIG. 1 in the region of the spring disk.

As is shown in FIG. 1 and FIG. 2, protective insert 9 has a radially outwardly extending supporting portion 17 which is formed integral, i.e., as one component part, with protective insert 9 at tubular portion 12 of protective insert 9. The protective accordion boot 13 is axially supported by its second end portion 15 at supporting portion 17 of protective insert 9 accompanied by a defined axial pre-loading. FIG. 1 and FIG. 2 further show that, with reference to the longitudinal extension axis A of damper tube 3, the supporting portion 17 extends radially past the inner diameter d of an end coil 18 of support spring 2 supported at spring disk 4.

Supporting portion 17 of protective insert 9 is formed of a material having elastic properties and can be reversibly deformed when the support spring is mounted.

Figure 3:
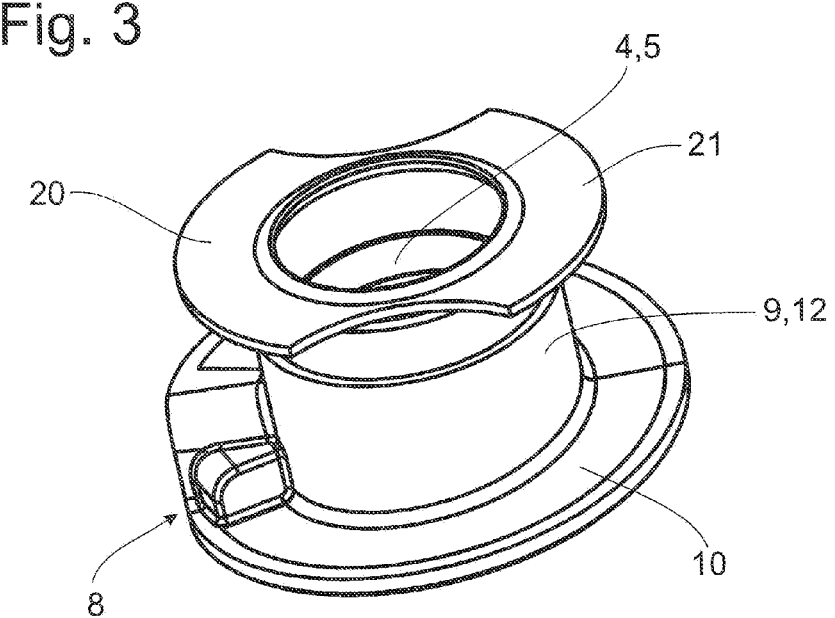
FIG. 3 is a perspective view of a constructional unit comprising spring disk with the protective insert mounted thereon.
Figure 4:
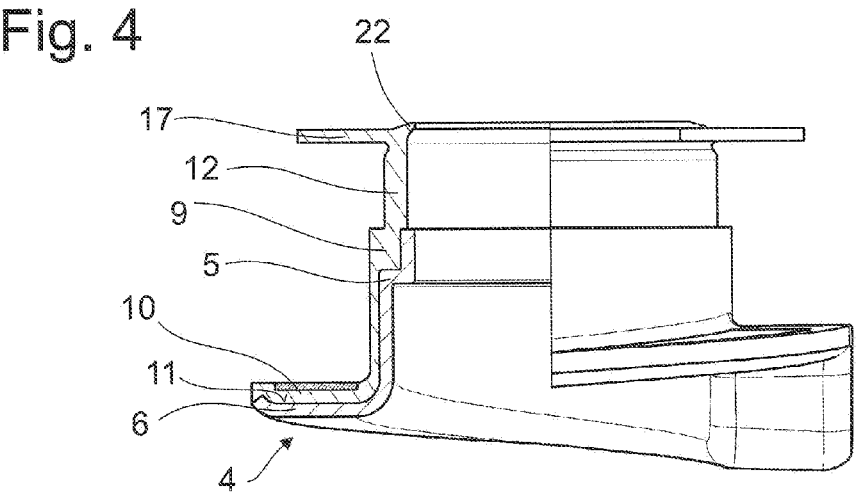
FIG. 4 is a sectional view of the constructional unit comprising spring disk with the protective insert according to FIG. 3 mounted thereon.

All of the drawing FIGS. 1 to 4 show that the tubular portion 12 of protective insert 9 has a recess 19 which extends radially and axially to a defined extent. FIG. 3 shows that the recess can be formed as a circumferential groove below supporting portion 17 at tubular portion 12. Accordingly, as is shown in the Figures, the reversibly deformable supporting portion can be folded downward from the end coil 18 of support spring 2 when support spring 2 is mounted so that the supporting portion substantially lies in the recess 19 and so that end coil 18 can pass supporting portion 17 axially. Thereafter, supporting portion 17 recovers its original shape and supports protective accordion boot 13 axially. Since supporting portion 17 of protective insert 9 axially supports protective accordion boot 13 accompanied by a defined axial pre-loading and prevents protective accordion boot 13 from slipping down, supporting portion 17 exerts a spring force directed opposite to the axial pre-loading of protective accordion boot 13. The supporting portion 17 can be modified in any way depending on the requirements regarding this spring force with respect to space. For example, it can be formed as a one-piece, undivided ring element or can comprise a plurality of segments. The supporting portion 17 shown by way of example in FIG. 3 comprises two segments 20; 21.

Further, FIGS. 1 to 4 show that protective insert 9 can have a sealing lip 22 which sealingly contacts damper tube 3 on the outer side in circumferential direction. Accordingly, the point of contact of spring disk 4 at damper tube 3 can be protected from contaminants.

Further, protective insert 9 and/or spring disk 4 can have an anti-torsion arrangement which fixes the support spring 2 with respect to rotational torsion relative to spring disk 4.

Figure 5:
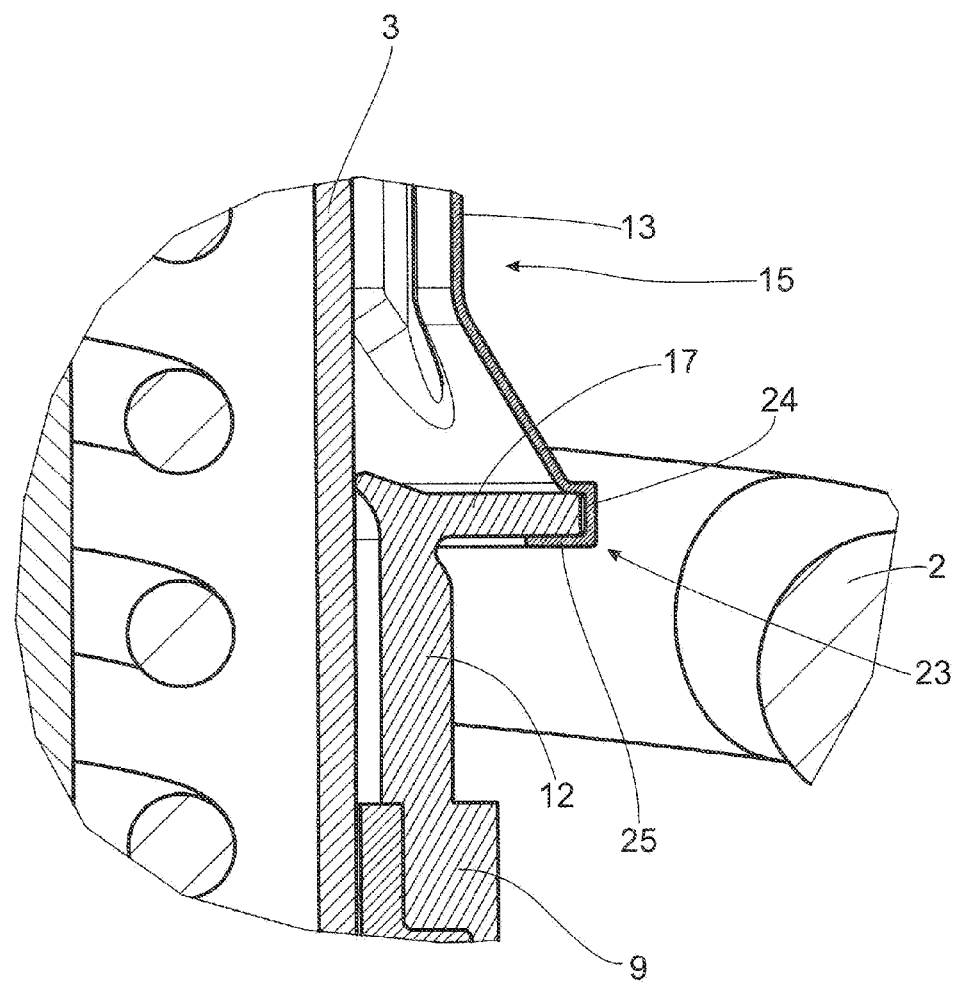
FIG. 5 is a detail of an exemplary constructional variant of the vibration damper according to patent claim 1.

FIG. 5 shows a detail of an exemplary embodiment of vibration damper 1 in accordance with the invention. It differs from the other figures in that protective accordion boot 13 has an axially operative retaining element 23 which is secured to protective insert 9 and fixes protective accordion boot 13 with respect to axial displacement relative to protective insert 9. The retaining element 23 embraces supporting portion 17 of protective insert 9 by an axial extension portion 24 formed at the retaining element 23 and by the radial extension portion 25 adjoining the axial extension portion 24. Accordingly, retaining element 23 is connected to protective insert 9 by positive engagement. However, the connection of retaining element 23 to protective insert 9 can certainly also be carried out by bonding engagement or frictional engagement. Retaining element 23 can be formed of one piece or can comprise a plurality of segments.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A vibration damper (1) for a motor vehicle, comprising:
a support spring (2)
a damper tube (3) having a piston rod (16) and a longitudinal extension axis (A);
a spring disk (4) having a substantially tubular spring disk collar (5) surrounding the damper tube (3) in circumferential direction, and a contact portion (6) spaced apart axially from the spring disk collar (5), the contact portion (6) having a surface (11) and a substantially plate-shaped radial extension (7) wherein the contact portion (6) axially supports the support spring (2) by the substantially plate-shaped radial extension (7) of the contact portion (6);
a protective insert (9) comprising a substantially disk-shaped portion (10) which at least partially covers the surface (11) of the contact portion (6) of the spring disk (4) facing the support spring (2), the protective insert (9) having a further, substantially tubular portion (12) which at least partially covers the spring disk collar (5);
a protective accordion boot (13) comprising a first end portion (14) and a second end portion (15), the protective accordion boot (13) being secured at least indirectly to the piston rod (16) by the first end portion (14), and the protective accordion boot (13) enclosing the damper tube (3) in circumferential direction by its second end portion (15), the protective insert (9) having at least one radially outwardly extending supporting portion (17), wherein the protective accordion boot (13) is axially supported by the second end portion (15) thereof at the supporting portion (17) of the protective insert (9) accompanied by a defined axial pre-loading, and wherein, with respect to the longitudinal extension axis (A) of the damper tube (3), the supporting portion (17) extends radially beyond an inner diameter (d) of an end coil (18) of the support spring (2) supported at the spring disk (4).

2. The vibration damper (1) according to claim 1, wherein at least the supporting portion (17) of the protective insert (9) is formed of a material having elastic properties and is reversibly deformable.

3. The vibration damper according to claim 1, wherein the supporting portion (17) is formed at the tubular portion (12) of the protective insert (9).

4. The vibration damper according to claim 1, wherein the tubular portion (12) of the protective insert (9) has at least one recess (19) extending a defined distance radially and axially.

5. The vibration damper according to claim 1, wherein the supporting portion (17) and the protective insert (9) are formed integrally, as one component part.

6. The vibration damper according to claim 1, wherein the protective insert (9) has a sealing lip (22) which sealingly contacts the damper tube (3) on the outer side in circumferential direction.

7. The vibration damper according to claim 1, wherein the supporting portion (17) comprises a plurality of segments (20; 21).

8. The vibration damper according to claim 1, wherein at least one of the protective insert (9) and spring disk (4) comprise an anti-torsion arrangement (8) which fixes the support spring (2) with respect to rotational torsion relative to the spring disk (4).

9. The vibration damper according to claim 1, wherein the protective accordion boot (13) comprises an axially operative retaining element (23) secured to protective insert (9) for opposing an axial displacement of the protective accordion boot (13) relative to the protective insert (9).

* * * * *